United States Patent [19]

Hinch

[11] Patent Number: 5,535,038
[45] Date of Patent: Jul. 9, 1996

[54] APPARATUS AND METHOD FOR DETERMINING EXTINCTION RATIO OF DIGITAL LASER TRANSMITTERS

[76] Inventor: Stephen W. Hinch, 4735 Burns Ct., Santa Rosa, Calif. 95405

[21] Appl. No.: 261,566

[22] Filed: Jun. 17, 1994

[51] Int. Cl.$^6$ .................. H04B 10/04; H01S 3/00
[52] U.S. Cl. .................. 359/180; 359/110; 372/38
[58] Field of Search ................. 372/26, 30, 31, 372/38; 359/180, 181, 182, 184, 187, 110; 356/73.1

[56] References Cited

U.S. PATENT DOCUMENTS

| | | | |
|---|---|---|---|
| 5,027,362 | 6/1991 | Hokanson et al. | 372/38 |
| 5,028,131 | 7/1991 | Donsmore | 356/73.1 |
| 5,309,542 | 5/1994 | Strope et al. | 385/140 |
| 5,311,005 | 5/1994 | Visocchi | 359/187 |
| 5,402,433 | 3/1995 | Stiscia | 372/38 |
| 5,408,485 | 4/1995 | Ries | 372/38 |

*Primary Examiner*—Leo Boudreau
*Assistant Examiner*—Bhavesh Mehta

[57] ABSTRACT

An apparatus and method are provided based directly on measurement of power to enable an accurate and repeatable determination of extinction ratio. One implementation includes an optical-to-electrical (O/E) converter responsive to a modulated optical signal, a multimeter connected to the O/E converter for measuring a voltage corresponding to average optical power, a power meter connected to the O/E converter for measuring a voltage corresponding to the optical power in the modulation signal, and a microprocessor for determining the extinction ratio from the measured signals corresponding to average optical power and optical power in the modulation signal.

12 Claims, 7 Drawing Sheets

APPARATUS AND METHOD FOR DETERMINING EXTINCTION RATIO OF DIGITAL LASER TRANSMITTERS

BACKGROUND OF THE INVENTION

This invention relates to electronic instruments for detecting and/or measuring the performance characteristics of systems, subsystems, and components incorporated into telecommunications systems and, more particularly, to electronic instruments for detecting and/or measuring the performance of modulated optical sources employed in optical telecommunications systems. Specifically, one embodiment of the invention provides an apparatus and method for determining the extinction ratio of a digitally modulated optical source, such as a laser transmitter, in an optical telecommunications system. Measurement of parameters for determining extinction ratio in accordance with one embodiment of the invention provides a more accurate determination of extinction ratio than has been available in the past, thereby enabling better design and precise characterization of digital laser transmitters.

Extinction ratio is an important performance characteristic of laser transmitters used in optical telecommunications systems. It is a measure of the amplitude of the digital modulation on the optical carrier and, therefore, affects the power penalty, or distance over which an optical fiber telecommunications system can reliably transmit and receive a signal. It is also a characteristic that is very difficult to accurately determine using known measurement techniques.

Standards for optical telecommunications systems, such as SONET, SDH, and Fibre Channel, specify minimum extinction ratio requirements for laser transmitters. Since extinction ratio is explicitly specified in these standards, it is important that any given laser transmitter, when its performance is measured on different test systems, yields a similar extinction ratio value. Nevertheless, a common problem in the industry today is that a laser transmitter manufacturer can measure a transmitter as within specification on one test system, yet the customer measures it as out of specification on another test system.

Considered in more detail, with reference to FIG. 1, extinction ratio is defined as:

$$ER = P_1/P_0$$

where $P_1$ is the average power (or energy) in a logic one bit and $P_0$ is the average power (or energy) in a logic zero bit. Extinction ratio is often also specified as a dB value:

$$XR = 10 \log (ER)$$

Alternatively, some textbooks define extinction ratio as a percent based on the inverse of the above definition:

$$XT = 100/ER$$

This definition is particularly preferred in Europe. In the following analysis, it is considered that extinction ratio is defined by ER, although the analysis is identical irrespective of which definition is adopted.

While it would seem that an infinite extinction ratio value is best, because this represents maximum signal swing, it is not practically achievable for laser transmitters. When a laser transmitter is biased to the completely "off" state (i.e., when transmitting a logic zero), it suffers from turn-on delays and waveform distortions that can cause transmission errors. Therefore, as shown in FIG. 1, laser transmitters are typically biased so that a small amount of optical power above the dark level is transmitted even when transmitting a logic zero pulse. This reduces extinction ratio, and, consequently, the optimum bias point for the laser transmitter is a compromise between least turn-on delay and best extinction ratio.

In accordance with the present state of the art, extinction ratio is determined using measurements with an oscilloscope after converting from the optical signal to an electrical signal with an optical-to-electrical converter, as shown in FIG. 2. The determination of extinction ratio is typically performed based on an eye diagram, which is a convenient way of displaying all possible sequences of logic ones and zeroes by overlapping them on the display of the oscilloscope, as shown in FIG. 3.

Now, the oscilloscope shown in FIG. 2 does not directly measure the average power in the logic one and zero bits. Instead, these values are approximated by determining the average logic one and logic zero voltages, as shown in FIG. 3. This technique is described, for example, in the current draft of Telecommunications Industries Association (TIA) procedure OFSTP-4. See, Optical Eye Pattern Measurement Procedure, OFSTP-4, TIA/EIA-526-4, Telecommunications Industries Association, Draft Standard Proposal No. 2372, 1993.

Unfortunately, the presently used technique for measuring parameters to determine extinction ratio is subject to severe errors that render it impossible to reliably obtain an accurate extinction ratio value. Some of the sources of error are as follows.

The exact definition of extinction ratio requires that the average optical power in the logic one and logic zero pulses be measured. The oscilloscope measurement technique, however, does not measure the true average powers in the logic one and zero bits. Instead, it measures logic one and zero voltages that are related to the peak (not average) optical power at some instant in time.

More particularly, the logic one and zero voltages measured by the oscilloscope depend on several factors. One factor is whether or not the voltage is averaged over the entire bit period or only over a small fraction of time at the center of the bit period. Another factor is whether the average values are defined as the mean of a histogram, the most prevalent value of a histogram, or some other definition. The measurement result is therefore only an approximation of the true extinction ratio and can have a significant error in some cases.

For example, consider the two waveforms illustrated in FIG. 4. According to the exact definition of extinction ratio, the waveform on the left should result in determination or a lower extinction ratio than the one on the right, because the total energy in the bit is less. Using the oscilloscope measurement technique, however, both waveforms would produce the same measurement, because they both reach the same mean peak value.

Another source of error relates to the measurement bandwidth. The exact values of the average logic one and zero voltages are highly dependent on the bandwidth and frequency response of the measurement system. For this reason, OFSTP-4 recommends the measurement bandwidth to be maintained within ±0.3 dB of a certain nominal response. Nevertheless, analysis has shown that frequency response variations within this tolerance can cause the extinction ratio on a signal with nominal 10 dB XR to vary by as much as ±0.75 dB.

An additional source of error is oscilloscope accuracy. Surprisingly, the ac accuracy of oscilloscopes is not clearly specified. Instead, it must be inferred from the dc accuracy specification and the frequency response specification of the oscilloscope. Important parameters, such as overshoot and ringing, are also rarely guaranteed. Nevertheless, all of these parameters have significant impact on measurements to determine extinction ratio. Accordingly, measurement of parameters for determination of extinction ratio is one of the most difficult measurements for an oscilloscope to perform accurately. Also, because the measurement depends on unspecified oscilloscope parameters, any resulting measurement cannot be guaranteed as traceable to reference standards.

It would therefore be desirable to provide a more accurate determination of extinction ratio. Such an extinction ratio determination would provide more meaningful information to engineers during design of digital laser transmitters and increase reliability with regard to deployment of such transmitters in optical telecommunications systems.

The problem with the present state of the art technique used to measure parameters to determine extinction ratio is that extinction ratio is defined as the ratio of two average optical powers that cannot be directly measured using an oscilloscope. An improved approach would be one which measures these two powers directly. Since power is one of the most basic measurements and can be traced to fundamental standards, a measurement apparatus and method based directly on measurement of power would be the most accurate and repeatable approach possible in connection with determination of extinction ratio.

SUMMARY OF THE INVENTION

One embodiment of the invention provides an improved apparatus and method for determining extinction ratio of modulated optical sources, such as digital laser transmitters. In accordance with the embodiment of the invention, an apparatus and method are provided based directly on measurement of power to enable an accurate and repeatable determination of extinction ratio. Preferably, the apparatus comprises optical-to-electrical (O/E) conversion means responsive to a modulated optical signal for producing an electrical signal, means connected to the O/E conversion means for measuring the electrical signal to provide a first signal corresponding to average optical power, means connected to the O/E conversion means for measuring the electrical signal to provide a second signal corresponding to the optical power in the modulation signal, and means connected to the power measuring means for determining the extinction ratio from the first and second signals corresponding to average optical power and optical power in the modulation signal. The method in accordance with one embodiment of the invention for determining extinction ratio of a modulated optical signal produced by a modulated optical source comprises the steps of converting the modulated optical signal to an electrical signal, measuring the electrical signal to provide a first signal corresponding to average optical power in the modulated optical signal, measuring the electrical signal to provide a second signal corresponding to optical power in the modulation signal, and determining an extinction ratio value from the first and second signals corresponding to the average optical power in the optical signal and the optical power in the modulation signal.

BRIEF DESCRIPTION OF THE DRAWINGS

The above and other objects and features and the concomitant advantages of the present invention will be better understood and appreciated by those skilled in the art in view of the description of the preferred embodiments given below in conjunction with the accompanying drawings. In the drawings.

DETAILED DESCRIPTION OF THE PREFERRED EMBODIMENTS

By way of example, the invention will be described in connection with a digital laser transmitter, because such a transmitter typically serves as the source in an optical telecommunications system. However, the extinction ratio determination apparatus and method in accordance with the invention can be used in connection with any digitally modulated optical source where extinction ratio is an important performance characteristic.

Figure 1:
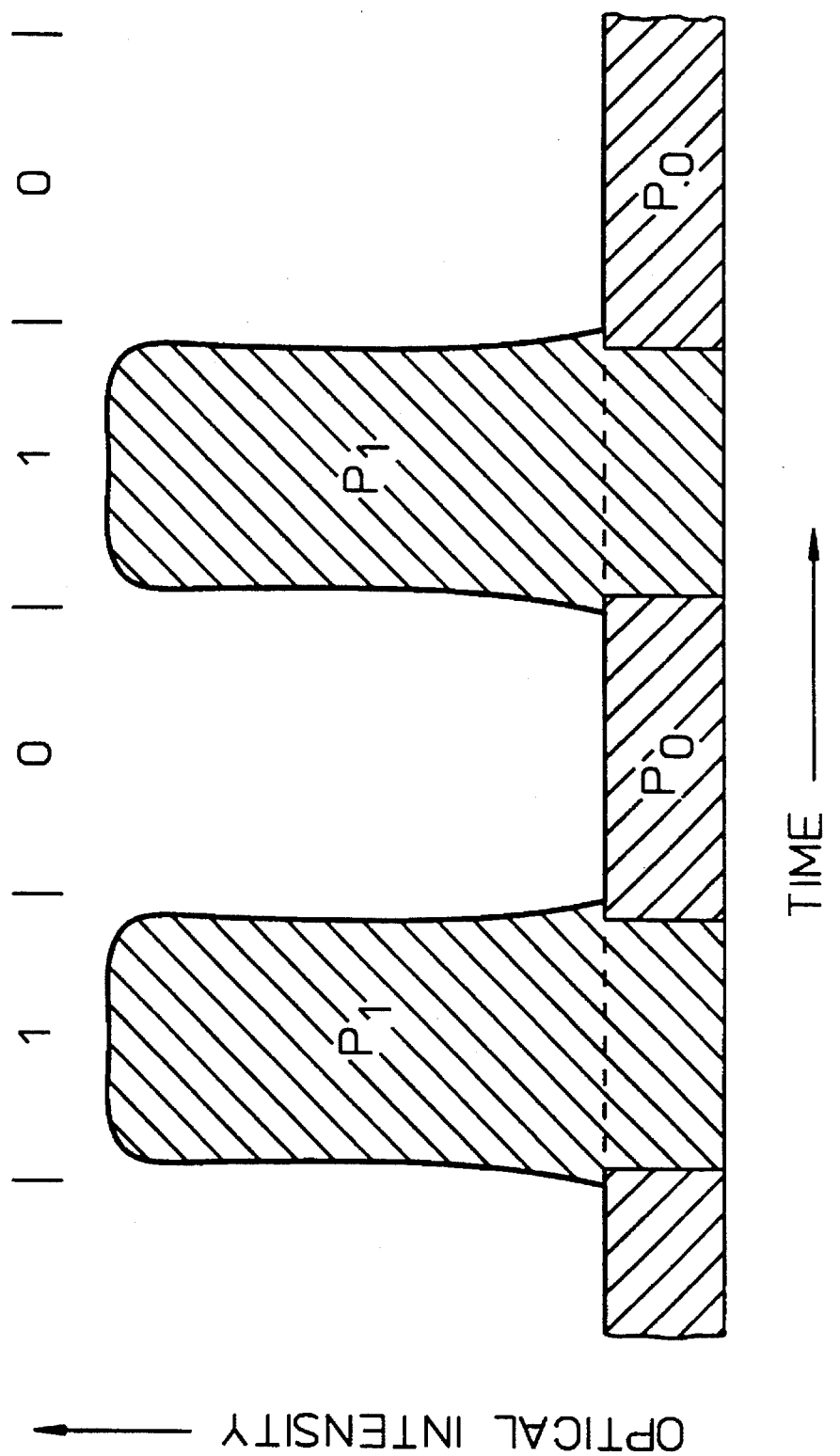
FIG. 1 illustrates a digitally modulated optical signal produced by a laser transmitter to facilitate an understanding of the definition of extinction ratio.
Figure 2:
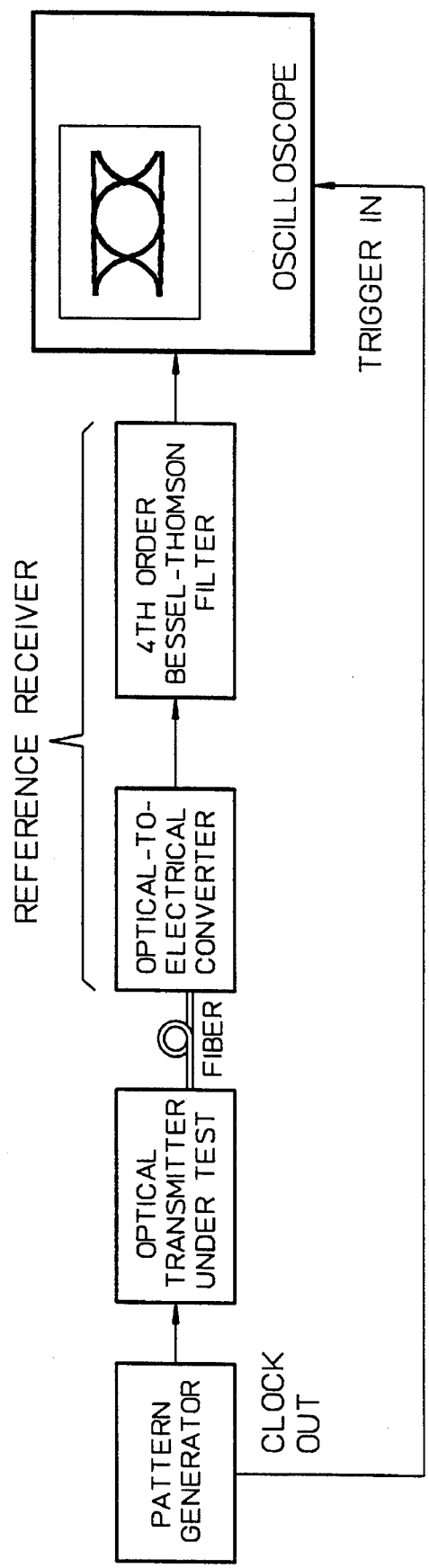
FIG. 2 is a block diagram of a conventional system to measure parameters for determining extinction ratio.
Figure 3:
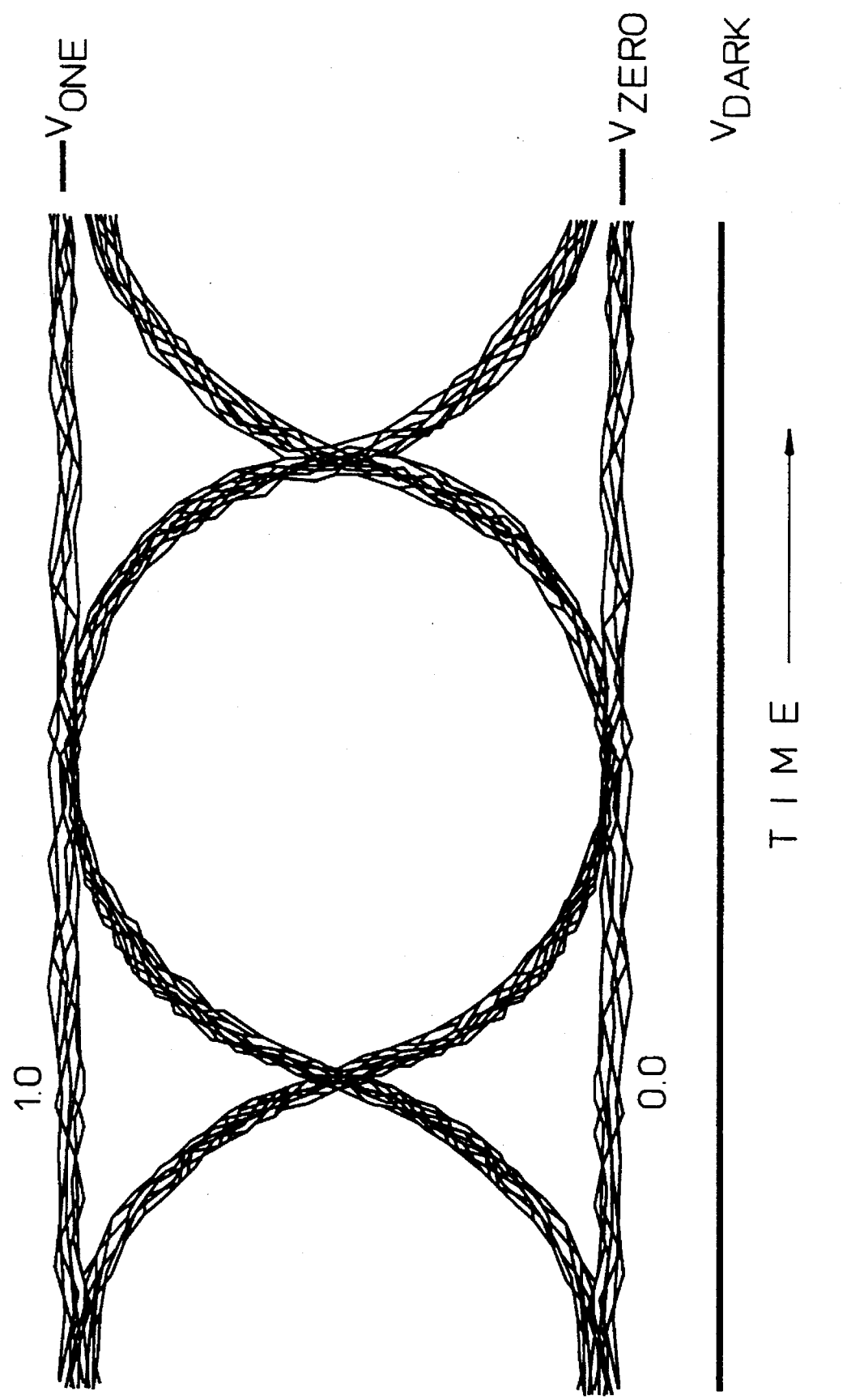
FIG. 3 illustrates an eye diagram display produced on the display of the oscilloscope included in the measurement system shown in FIG. 2, from which extinction ratio is traditionally determined.
Figure 4:
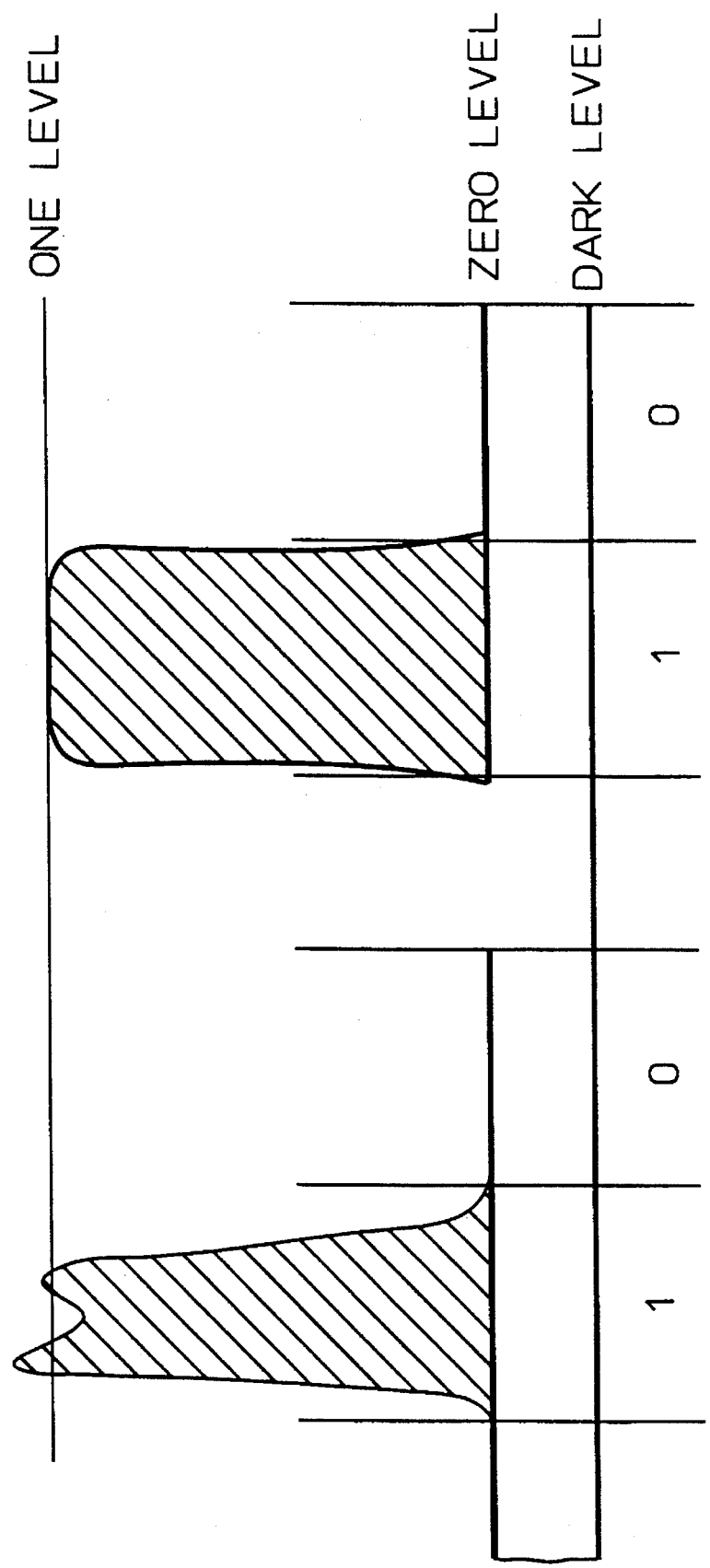
FIG. 4 illustrates two different waveforms which produce the same extinction ratio value when the measurement system shown in FIG. 2 is used for determining extinction ratio.
Figure 5:
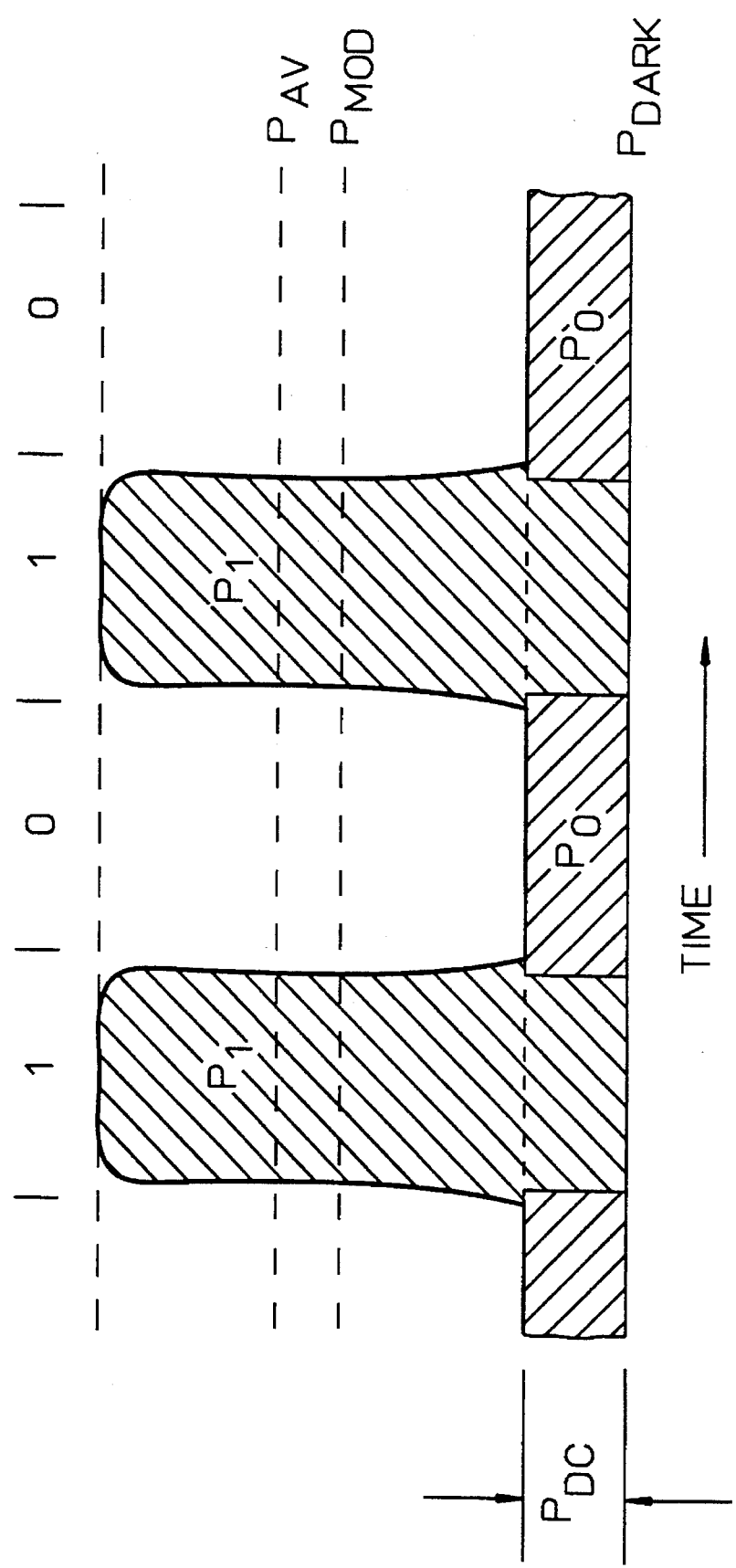
FIG. 5 illustrates a digitally modulated optical signal produced by a laser transmitter to facilitate an understanding of the determination of extinction ratio based on power measurements in accordance with one embodiment of the method of the invention.

To understand the principle of the power-based extinction ratio determination apparatus and method in accordance with the invention, consider the case of an optical carrier modulated with a repetitive one-zero pattern having non-zero extinction ratio, as shown in FIG. 5. In the non-return-to-zero (NRZ) coding format employed in typical optical telecommunications systems, this corresponds to transmission of a square-wave pattern whose frequency is half the bit rate. This square-wave pattern renders the analysis easy to understand, but the extinction ratio determination apparatus and method in accordance with the invention are effective for any data pattern, so long as the mark density of the pattern is known. (Mark density is defined as the fraction of the total pattern that consists of digital ones. A square wave, for example, has a mark density of 0.5, or 50%.) The following analysis assumes 50% mark density, or equal probability of logic ones and zeroes.

As shown in FIG. 5, the total optical power can be divided into two portions, namely, the power in the modulation signal and a residual dc power due to the non-zero extinction ratio of the signal. The following parameters shown in FIG. 5 are defined as follows:

$P_{MOD}$ is the average power in the modulation signal
$P_{DC}$ is the residual dc optical power The average power in the optical signal is the sum of these two components:

$$P_{AV} = P_{MOD} + P_{DC} \qquad (1)$$

Note that all of the energy in the modulation signal, $P_{MOD}$, occurs because of the transmission of logic ones. No modulation energy is contained in the transmission of a logic zero. When the modulation signal is measured with a power meter, however, this energy is averaged over both the logic one and zero bits. Consequently, for a mark density of 0.5, the modulation power in a logic one is found by doubling the total modulation power.

The average power in a logic one is then found from:

$$P_1 = 2P_{MOD} + P_{DC} \qquad (2)$$

and the power in a logic zero is:

$$P_0 = P_{DC} \qquad (3)$$

So the extinction ratio is:

$$ER = \frac{2P_{MOD} + P_{DC}}{P_{DC}} \qquad (4)$$

Also, from equation (1), $$P_{DC} = P_{AV} - P_{MOD} \qquad (5)$$

Substituting equation (5) into equation (4):

$$ER = \frac{P_{AV} + P_{MOD}}{P_{AV} - P_{MOD}} \qquad (6)$$

Therefore, if $P_{MOD}$ and $P_{AV}$ can be measured, ER can be determined.

Figure 6:
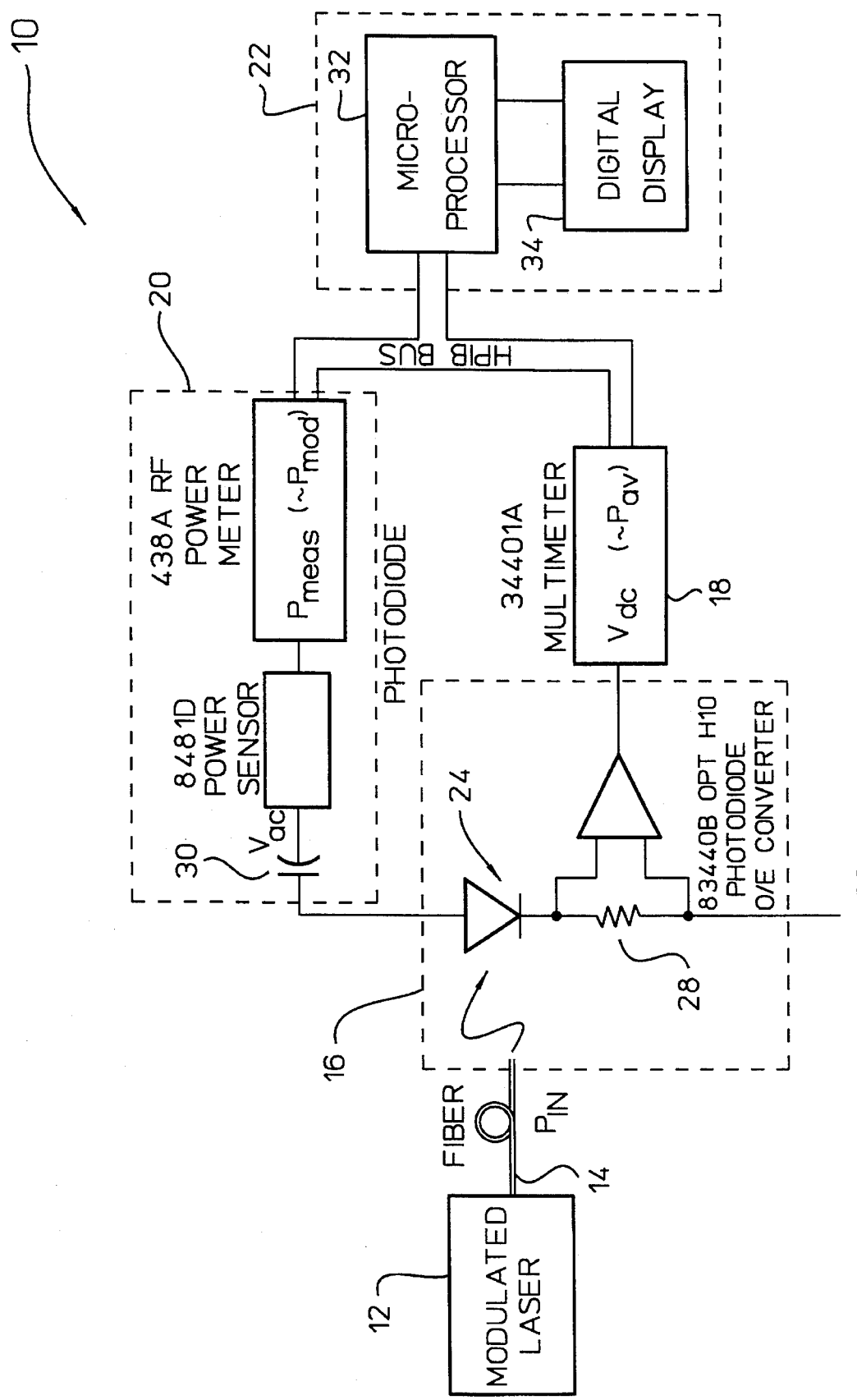
FIG. 6 is a block diagram of one embodiment of the extinction ratio determination apparatus in accordance with the invention.

One embodiment of the extinction ratio determination apparatus in accordance with the invention, generally indicated by the numeral 10, is shown in FIG. 6. The extinction ratio determination apparatus 10 is configured to simultaneously measure both parameters $P_{MOD}$ and $P_{AV}$ of a digitally modulated optical signal produced by an optical source 12, such as a laser transmitter. The digitally modulated optical signal propagates through an optical fiber 14.

The extinction ratio determination apparatus 10 in accordance with the embodiment of the invention shown in FIG. 6 generally comprises four elements. These elements are an optical-to-electrical (O/E) conversion means 16, means 18 connected to the O/E conversion means for measuring a first signal corresponding to average optical power, $P_{AV}$, means 20 connected to the O/E conversion means for measuring a second signal corresponding to the optical power in the modulation signal, $P_{MOD}$, and means 22 connected to the power measuring means 18 and 20 for determining the extinction ratio from the measured values of $P_{MOD}$ and $P_{AV}$.

As shown in FIG. 6, the O/E conversion means 16 preferably comprises a photodiode 24 connected to a voltage bias source 26. For example, the photodiode 24 can be an HP 83440B OPT H1.0 photodiode available from Hewlett-Packard Company, Palo Alto, Calif., which is a wide bandwidth non-amplified PIN photodiode. (Option H10 includes average power monitoring circuitry that can be connected directly to an HP 34401A multimeter available from Hewlett-Packard Company.) The frequency response of a non-amplified PIN photodiode is extremely flat to many GHz, greatly reducing the effect of frequency response variations. The bandwidth is selected to be greater than the highest signal frequency of interest so that the entire spectrum of the optical signal is measured.

One well-known approach for measuring $P_{AV}$, such as used in various electronic instruments, for example, the HP 71400A available from Hewlett-Packard Company, is based on the fact that the average bias current through the photodiode 24 is directly proportional to the average incoming optical power, $P_{AV}$. To measure this bias current, a resistor 28 is inserted in series with the bias source 26 and the photodiode 24, and the voltage across the resistor is monitored by the means 18 for measuring $P_{AV}$, for example, a precision voltmeter, such as the HP 34401A multimeter available from Hewlett-Packard Company. The voltage measured by the precision voltmeter is proportional to the average current through the photodiode 24, which is in turn proportional (i.e., based on the conversion factor of the photodiode) to the average incoming optical power, $P_{AV}$.

The means 20 for measuring the power in the modulation signal, $P_{MOD}$, preferably comprises an RF power meter, such as an HP 438A power meter available from Hewlett-Packard Company, with an HP 8481D power sensor head, also available from Hewlett-Packard Company, coupled to the photodiode 24 by a capacitor 30 incorporated into the HP 8481D power sensor head. As described below, the RF power measured by the power meter is proportional to $P_{MOD}$.

Because the photodiode 24 converts optical power to electrical voltage rather than to electrical power, the power measured by the RF power meter is related to, but is not exactly $P_{MOD}$. Instead, $P_{MOD}$ is found from the measured RF power as follows.

The relationship between the modulated optical power at the input of the photodiode 24 and the RF voltage at the output of the photodiode is given by:

$V_{meas} = CP_{MOD}$ where C is the conversion gain of the photodiode. For a 50 ohm system, the average RF power measured by the RF power meter is then:

$$P_{meas} = \frac{(V_{meas})^2}{R} = \frac{(CP_{MOD})^2}{50} \qquad (7)$$

So, $$P_{MOD} = \sqrt{\frac{50 P_{meas}}{C^2}}$$

The voltage measured by the power meter is proportional to the square root of the average modulation power, $P_{MOD}$, contained in the optical signal.

The measurements of $P_{MOD}$ and $P_{AV}$ are then routed by an HPIB (IEEE 488) data bus to the means 22 for determining the extinction ratio, such as a microprocessor 32, which determines the extinction ratio from equation (6). The microprocessor 32 is preferably connected to a display 34, such as a digital readout, for displaying the extinction ratio value.

Figure 7:
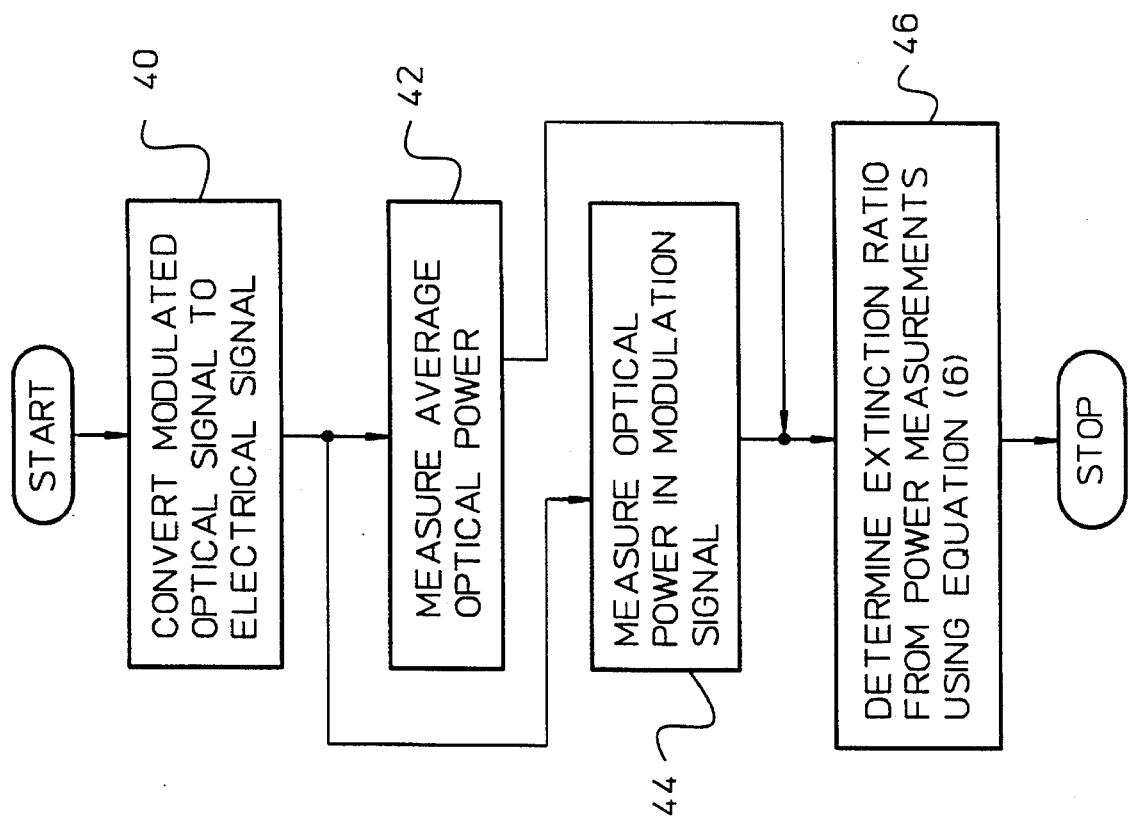
FIG. 7 is a flow chart of one embodiment of a method in accordance with the invention for determining extinction ratio.

One embodiment of the method for determining extinction ratio in accordance with the invention is diagrammed by the flow chart shown in FIG. 7. As shown in FIG. 7, the modulated optical signal produced by the laser transmitter 12 shown in FIG. 6 is converted to an electrical signal by the O/E conversion means 16, as indicated by the numeral 40 shown in FIG. 7. The average optical power in the optical signal, $P_{AV}$, is then measured, as indicated by the numeral 42 shown in FIG. 7. Simultaneously, the optical power in the modulation signal, $P_{MOD}$, is measured, as indicated by the numeral 44 shown in FIG. 7. Finally, the extinction ratio value is determined from the average optical power in the optical signal, $P_{AV}$, measured at the step 42 and the optical power in the modulation signal, $P_{MOD}$, measured at the step 44, as indicated by the numeral 46 shown in FIG. 7.

The apparatus and method in accordance with the invention directly address the three measurement problems which arise in connection with determination of the extinction ratio using the present state of the art technique. The power based method measures true average power in the logic one and zero bits, so it meets the definition described in industry standards. Also, by selecting the bandwidth of the measurement apparatus to be greater than the highest signal frequency of interest, all of the power in the optical signal is measured. The non-amplified PIN photodiode provides a very flat frequency response, so the effect of frequency response variations is minimal. Therefore, unlike the oscilloscope approach used by the known technique, two different power meter systems measuring the same laser transmitter arrive at very similar results. Finally, since this measurement method is based totally on power measurements, the accuracy of these measurements can be easily quantified and referenced to traceable standards. This means that a true measurement uncertainty can be calculated.

It will be understood and appreciated that the embodiment of the present invention described above is susceptible to various modifications, changes, and adaptations. All is intended to be comprehended within the meaning and range of equivalents of the appended claims.

What is claimed is:

1. An apparatus for determining extinction ratio of a modulated optical signal produced by a modulated optical source, comprising:

optical-to-electrical (O/E) conversion means responsive to the modulated optical signal for generating an electrical signal, the O/E conversion means having a conversion gain, C;

first means connected to the O/E conversion means for measuring the electrical signal to provide a first signal, $P_{AV}$, corresponding to average optical power in the modulated optical signal;

second means having an input impedance, R, connected to the O/E conversion means for measuring the electrical signal to provide a second signal, $P_{meas}$, proportional to optical power, $P_{MOD}$, in the modulation signal, where:

$$P_{MOD} = \sqrt{\frac{R\,P_{meas}}{C^2}} \quad ; \text{and}$$

means connected to the first and second means for determining an extinction ratio value, ER, from the first and second signals corresponding to average optical power in the modulated optical signal and optical power in the modulation signal, where $ER = (P_{AV} + P_{MOD})/(P_{AV} - P_{MOD})$.

2. The apparatus of claim 1 wherein the first signal is a voltage proportional to the average current through the optical-to-electrical conversion means, which is in turn proportional to the average incoming optical power, and the second signal is a voltage proportional to the square root of average modulation power contained in the modulated optical signal.

3. The apparatus of claim 1 wherein the optical-to-electrical conversion means is a photodiode connected to a voltage bias source.

4. The apparatus of claim 3 wherein the photodiode is a non-amplified PIN photodiode.

5. The apparatus of claim 3 wherein a resistor is inserted in series with the voltage bias source and the photodiode and the means connected to the optical-to-electrical conversion means for measuring the electrical signal to provide a first signal corresponding to average optical power in the modulated optical signal comprises a voltmeter for measuring the voltage across the resistor.

6. The apparatus of claim 1 wherein the means connected to the optical-to-electrical conversion means for measuring the electrical signal to provide a second signal corresponding to optical power in the modulation signal comprises an RF power meter having a power sensor head coupled to the photodiode by a capacitor.

7. The apparatus of claim 1 wherein the means connected to the first and second means for determining the extinction ratio value from the first and second signals comprises a microprocessor.

8. The apparatus of claim 7, further comprising a display connected to the microprocessor for displaying the extinction ratio value.

9. The apparatus of claim 8 wherein the display is a digital readout.

10. A method for determining extinction ratio of a modulated optical signal produced by a modulated optical source, comprising the steps of:

converting the modulated optical signal to an electrical signal with a conversion gain, C;

measuring the electrical signal to provide a first signal, $P_{AV}$, corresponding to average optical power in the modulated optical signal;

measuring the electrical signal to provide a second signal, $P_{meas}$, proportional to optical power, $P_{MOD}$, in the modulation signal, where:

$$P_{MOD} = \sqrt{\frac{R\,P_{meas}}{C^2}} \quad ; \text{and}$$

determining an extinction ratio value, ER, from the first and second signals corresponding to the average optical power in the modulated optical signal and the optical power in the modulation signal, where $ER = (P_{AV} + P_{MOD})/(P_{AV} - P_{MOD})$.

11. The method of claim 10 wherein the electrical signal is measured to provide the first and second signals simultaneously.

12. The method of claim 10 wherein the first signal is a voltage proportional to the average current through an optical-to-electrical conversion means, which is in turn proportional to the average incoming optical power, and the second signal is a voltage proportional to the square root of average modulation power contained in the modulated optical signal.

* * * * *